United States Patent Office 2,734,087
Patented Feb. 7, 1956

2,734,087

DIMETHYL-CHLORO-PHENOXY PROPANOLS

Frank M. Berger, Metuchen, Clarence V. Hubbard, New Brunswick, and Bernard J. Ludwig, Milltown, N. J., assignors, by mesne assignments, to Carter Products, Inc., New York, N. Y., a corporation of Maryland No Drawing. Application January 3, 1951,
Serial No. 204,268

3 Claims. (Cl. 260—613)

This invention relates to organic compounds and has for its object the provision of a new group of phenoxy compounds. The compounds of the invention may be described as the hydroxy-n-propyl ethers of p-chloro-m-xylenol and have the general formula

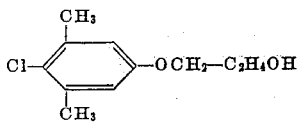

Specific compounds of this general type and their physical properties are as follows:

1-(3,5-dimethyl-4-chlorophenoxy)-2-propanol,

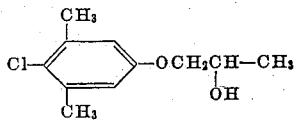

This compound is a white crystalline solid, melting point 62° C., less than 0.1% soluble in water at ordinary room temperature, and soluble in most common organic solvents.

1-(3,5-dimethyl-4-chlorophenoxy)-3-propanol,

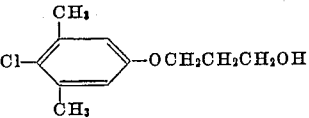

This compound is a white crystalline solid, melting point 53–54° C., less than 0.1% soluble in water at ordinary room temperature, and soluble in most common organic solvents.

These compounds may be prepared by a variety of methods, the most convenient of which are the following:

1. Condensation of 3,5-dimethyl-4-chlorophenol (also known as p-chloro-m-xylenol) with the appropriate chlorohydrin, using alkali in aqueous or non-aqueous solution as the condensing agent.

2. Condensation of 3,5-dimethyl-4-chlorophenol with the appropriate epoxide, using alkali as the condensation catalyst.

When condensation takes place between the substituted phenol and glycerol α-monochlorohydrin, it is theoretically possible that the reaction could lead to not only 3-(3,5-dimethyl-4-chlorophenoxy)-1,2-propanediol, but also the isomeric 2-(3,5-dimethyl-4-chlorophenoxy)-1,3-propanediol. Condensations of this type are described in the chemical literature, wherein similar phenol derivatives are reacted under alkaline conditions with glycerol α-monochlorohydrin leading to the formation of the 1,2-propanediol rather than the 1,3-propanediol. The most common examples of this condensation is the formation of mephenesin (3-o-toloxy-1,2-propanediol) from o-cresol and glycerol α-monochlorohydrin. In all probability therefore, the product obtained in the reaction described is 3-(3,5-dimethyl-4-chlorophenoxy)-1,2-propanediol.

Likewise, condensation of 3,5-dimethyl-4-chlorophenol and propylene chlorohydrin could theoretically lead to the formation of not only 1-(3,5-dimethyl-4-chlorophenoxy)-2-propanol but also to the isomeric 2-(3,5-dimethyl-4-chlorophenoxy)-1-propanol. Proof that the product obtained in this reaction is the 2-propanol rather than the 1-propanol isomer is afforded by reducing 3,5-dimethyl-4-chlorophenoxy acetone, using lithium aluminum hydride. This reduction, which can lead to only the 2-propanol isomer, gives a product identical in every respect to that obtained by direct condensation of 3,5-dimethyl-4-chlorophenol with propylene chlorohydrin or propylene oxide.

Examples of procedures found satisfactory for preparing these hydroxy-n-propyl ethers of p-chloro-m-xylenol are as follows:

EXAMPLE 1

156.5 parts of 3,5-dimethyl-4-chlorophenol are dissolved in 400 parts of water containing 45 parts sodium hydroxide. 95 parts propylene chlorohydrin are added and the mixture heated to boiling. With continuous stirring, the mixture is refluxed for two hours or until the reaction is substantially complete. Separation into two liquid layers takes place. After cooling, the reaction mixture is treated with 500 parts of ether or other suitable solvent and the aqueous layer discarded. Unreacted phenol and other water soluble components are removed by repeated or continuous extraction, first with dilute alkali solution, followed by water. The resulting ether solution is dried over a suitable drying agent and the solvent removed. The liquid residue is then distilled under reduced pressure, the portion distilling at 130–135° C. at 2 mm. mercury pressure being collected. Crystallization of the solidified distillate from benzene-petroleum ether mixture or other suitable solvent gives a white crystalline solid, melting point 62° C.

Analysis.—Calculated for $C_{11}H_{15}O_2Cl$: C, 61.5; H, 7.0. Found: C, 61.3; H, 6.7.

Approximately 85% of the theoretical yield of purified 1-(3,5-dimethyl-4-chlorophenoxy)-2-propanol is obtained.

EXAMPLE 2

To a solution of sodium ethylate prepared by dissolving 24 parts of sodium in 800 parts absolute ethanol, there is added 156.5 parts of 3,5-dimethyl-4-chlorophenol. 95 parts of propylene chlorohydrin are added, and the mixture is heated to boiling and refluxed for several hours under continuous agitation. The alcohol is removed by distillation, the unreacted phenol removed by steam distillation, and the residue treated with chloroform. Residual phenol and other water soluble components are removed by repeated or continuous extraction, using dilute aqueous alkali followed by water. The resulting solution is dried over a suitable drying agent and the solvent removed under reduced pressure. The residue obtained is allowed to solidify and the product recrystallized from benzene. Crystalline material identical to that described in Example 1 is obtained in a yield of approximately 50% of the theoretical.

EXAMPLE 3

156.5 parts of 3,5-dimethyl-4-chlorophenol and 58 parts of propylene oxide are allowed to stand for several days at ordinary room temperature in the presence of catalytic amount of potassium hydroxide added in the form of its concentrated aqueous solution. The resulting mixture is treated with ether or chloroform and worked up as described in Example 1. 1-(3,5-dimethyl-4-chlorophenoxy)-2-propanol is obtained in a substantial yield.

EXAMPLE 4

156.5 parts of 3,5-dimethyl-4-chlorophenol are dissolved in 300 parts of water containing 44 parts sodium hydroxide. 95 parts of 1,3-trimethylene chlorohydrin are added and the mixture heated to boiling. It is refluxed under continuous agitation for several hours or until the reaction is substantially complete. After cooling, the reaction mixture is treated with ether or other suitable solvent and the unreacted phenol and other water soluble components removed by repeated or continuous extraction, using dilute aqueous alkali followed by water. The resulting solution is dried over a suitable drying agent and the solvent removed under partial vacuum. The liquid residue is allowed to solidify and recrystallized using carbon tetrachloride or benzene-petroleum ether mixture. A yield of approximately 60% of the theory of purified 1-(3,5-dimethyl-4-chlorophenoxy)-3-propanol is obtained, melting point 53–54° C.

*Analysis.*—Calculated for $C_{11}H_{15}O_2Cl$: C, 61.5; H, 7.0. Found: C, 61.9; H, 7.3.

The compounds of the invention have been found to be very effective as fungicidal and bactericidal agents. These properties are shown by the following tables in which the concentrations are the minimum required to result in complete destruction of the organism. The compounds are in aqueous solution containing merely enough alcohol to effect solution.

Table I

ANTIMICROBIAL PROPERTIES OF 1-(3,5-DIMETHYL-4-CHLOROPHENOXY)-2-PROPANOL

| Organism | Concentration | |
|---|---|---|
| | Bacteriostatic or Fungistatic | Bactericidal or Fungicidal |
| E. coli | 1/5000 | 1/5000 |
| Staph. aureus | 1/5000 | 1/5000 |
| B. subtilus | 1/5000 | 1/1000 |
| Strep. hemolyticus | 1/5000 | 1/5000 |
| M. gypseum | 1/20000 | 1/2500 |
| T. mentagrophytes | 1/20000 | 1/10000 |
| T. rubrum | 1/20000 | 1/500 |
| M. audouini | 1/20000 | 1/10000 |
| C. albicans | 1/5000 | 1/2500 |

Table II

ANTIMICROBIAL PROPERTIES OF 1-(3,5-DIMETHYL-4-CHLOROPHENOXY)-3-PROPANOL

| Organism | Concentration | |
|---|---|---|
| | Bacteriostatic or Fungistatic | Bactericidal or Fungicidal |
| E. coli | 1/5000 | 1/5000 |
| Staph. aureus | 1/500 | 1/5000 |
| B. subtilus | 1/10000 | 1/10000 |
| Strep. hemolyticus | 1/10000 | 1/10000 |
| M. gypseum | 1/60000 | 1/5000 |
| T. mentagrophytes | 1/40000 | 1/5000 |
| T. rubrum | 1/40000 | 1/5000 |
| M. audouini | 1/40000 | 1/5000 |
| C. albicans | 1/5000 | 1/5000 |

We claim:

1. The organic compounds represented by the general formula

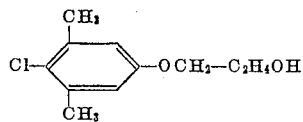

2. The organic compound 1-(3,5-dimethyl-4-chlorophenoxy)-2-propanol represented by the formula

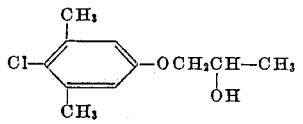

3. The organic compound 1-(3,5-dimethyl-4-chlorophenoxy)-3-propanol represented by the formula

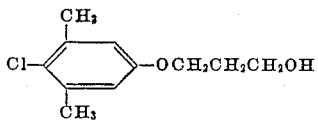

References Cited in the file of this patent

UNITED STATES PATENTS

| 2,416,263 | MacMullen | Feb. 18, 1947 |
| 2,626,227 | Lambrech | Jan. 20, 1953 |

FOREIGN PATENTS

| 219,325 | Germany | Feb. 23, 1910 |
| 613,735 | Great Britain | Dec. 2, 1948 |

OTHER REFERENCES

Berger: Journal of Pharmacology and Experimental Therapeutics, vol. 93, pp. 470–481 (1948), abstracted in Chemical Abstracts, vol. 43, page 312a (1949).